United States Patent
Oleksy (10) Patent No.: US 6,449,529 B1
(45) Date of Patent: Sep. 10, 2002

(54) PROCESS FOR CONTOUR MACHINING OF METAL BLOCKS

(76) Inventor: Henryk Oleksy, 1308 Drawbridge La., Lemont, IL (US) 60439

( * ) Notice: Subject to any disclaimer, the term of this patent is extended or adjusted under 35 U.S.C. 154(b) by 0 days.

(21) Appl. No.: 09/477,858

(22) Filed: Jan. 5, 2000

Related U.S. Application Data
(60) Provisional application No. 60/114,916, filed on Jan. 5, 1999.

(51) Int. Cl.[7] .............................. B23P 6/04; G06F 15/40
(52) U.S. Cl. ........................ 700/187; 29/889.1; 409/84
(58) Field of Search ................................. 700/181, 182, 700/187; 409/84, 95; 415/103; 29/23.51, 889.1

(56) References Cited

U.S. PATENT DOCUMENTS

| | | |
|---|---|---|
| 3,629,558 A | 12/1971 | Coggin |
| 4,237,598 A | 12/1980 | Williamson |
| 4,245,950 A * | 1/1981 | Shiohata et al. ............ 415/103 |
| 4,369,563 A | 1/1983 | Williamson |
| 4,523,270 A | 6/1985 | Kishi et al. |
| 4,546,427 A | 10/1985 | Kishi et al. |
| 4,621,410 A | 11/1986 | Williamson |
| 4,755,952 A | 7/1988 | Johns |
| 4,790,697 A | 12/1988 | Hines et al. |
| 4,811,253 A | 3/1989 | Johns |
| 4,833,617 A | 5/1989 | Wang |
| 4,893,971 A | 1/1990 | Watanabe et al. |
| 5,122,966 A | 6/1992 | Jansen et al. |
| 5,148,372 A | 9/1992 | Maiocco et al. |
| 5,197,013 A | 3/1993 | Dundorf |
| 5,278,767 A | 1/1994 | Kishi et al. |
| 5,285,572 A * | 2/1994 | Rathi et al. ................. 29/889.1 |
| 5,377,116 A | 12/1994 | Wayne et al. |
| 5,391,024 A | 2/1995 | Levine et al. |
| 5,396,160 A | 3/1995 | Chen |
| 5,455,778 A | 10/1995 | Ide et al. |
| 5,608,648 A | 3/1997 | Sundt |
| 5,815,400 A | 9/1998 | Hirai et al. |

* cited by examiner

Primary Examiner—Leo Picard
Assistant Examiner—Alexander Kosowski
(74) Attorney, Agent, or Firm—Leon I. Edelson; William C. Clarke; Levenfeld Pearlstein (57) ABSTRACT

A method of determining machining instructions during machining of a workpiece using a machine having a cutter, the surfaces of the workpiece being defined by a plurality of programmed instructions obtained by trigonometric analysis of the required curvatures of the surfaces.

4 Claims, 5 Drawing Sheets

PROCESS FOR CONTOUR MACHINING OF METAL BLOCKS

This application claims the benefits of Provisional Patent Application Ser. No. 60/114,916, filed Jan. 5, 1999.

BACKGROUND OF THE INVENTION

The present invention relates to the machining of engineering components having complex curved shapes and particularly to the machining of components having multiple complex curved surfaces in a single engineering component such as the root section of turbine blades.

When a root section of a turbine blade is produced by machining, the machining can be in several procedures, each requiring a separate machining operation with separate set-up requirements. These procedures can include cutting of the material stock to rough required shape, milling to required dimensions of the required stock dimensions, de-burring, grinding, machining again to required dimension; roughing the root section of the turbine blade by milling, rough and finish milling of the hook curvature of the root section, a final taper machining and hand grinding with sides milling to obtain the finished root section of a turbine blade. The finished root section of the turbine blade itself often has to satisfy allowable tolerances pertaining to that particular dimension, thickness, shape and curvature.

Presently, the method of preparing these root sections of a turbine blade with the many successive machining operations requires separate tolerance measurements, separate machining operations and multiple set-ups. The instant invention has been devised with the view to substantially eliminating the many separate procedures inherent in the prior art of machining root sections of turbine blades and has as its essential object an improved method for machining the root section of turbine blades on a vertical or horizontal machining center with rotary table.

SUMMARY OF THE INVENTION

In the machining of certain metal objects, such as turbine blades, machine gears with multi-faceted contours, multiple surfaces can be required to properly meet design requirements such as concave and convex surfaces, which meet and co-exist upon the same planar surface. In the process of manufacturing such metal objects with continuous planar surfaces, co-existent concave and convex surfaces are typically prepared by milling a metal block with a milling machine to prepare the required planar curved surfaces with high accuracy.

The instant invention comprises a process for contour control machining of metal blocks by providing a control procedure for standard computer numerical control conventional milling machines to machine convex and concave curvature on a vertical machining center with rotary table or horizontal machining center with integrated rotary table.

The instant invented process reduces the number of separate procedures required in a conventional machining procedure using a conventional milling machine by permitting all metal cutting and machining steps to be done on a vertical or horizontal machining center. All cutting, grinding and machining is performed on one milling machine in contrast to the use of more than one cutting machining, grinding, and milling machine required in a conventional process.

BRIEF DESCRIPTION OF THE INVENTION

FIGS. 2, 3, 4 and 5 accordingly illustrate the control process as applied to the hook curvature required of the turbine blade base to permit installation of the turbine blade member upon a turbine rotor.

FIGS. 2, 3, 4 and 5 detail the process of programming a milling machine to cause the milling machine to mill concave and convex surfaces to cause the resulting root section of the turbine blade to be mounted upon a turbine rotor in a precise fit.

DETAILED DESCRIPTION

The invention comprises computer aided program for a milling machine to machine precise concave and convex surfaces within a metal block so as to form the base section of a turbine blade, called the root section (1). The root section of the turbine blade is designed to fit within precise tolerances upon a circular turbine wheel. The rotation of the rotor in use generates extreme centrifugal force. The separate construction of turbine blades, requires that the fit of the turbine blades upon the rotor be within precise limits and that the separate turbine blade components be identical to avoid misalignment of the turbine rotor with possible vibration during operation.

The root section of the turbine blade is designed to fit within precise tolerances upon a circular rotor. Because of the curvatures of the mating surface of the root section of the turbine blade and the mating section of the circular rotor, the machining of the root section of the turbine blade requires convex movements of the form cutter tool (9) and the rotating of the rotary table (7) which holds the root section of the turbine blades. The form cutter (9) travels on a convex line (center line, See FIG. 5) from point A to point L following convex path (E+R), the form cutter spins and the rotary table simultaneously rotates from angle $-Q°$ to angle $+Q°$, (See FIG. 5) this operation can be also approached at point L and finished at point A.

Reference to FIGS. 2, 3, 4 and 5 illustrates the movements described above. The form cutter will engage the blank root section (See FIG. 2) which is to be approach at Point A (See FIG. 5) and will effectively be positioned to engage the root section along the convex line extending to the left which, in FIG. 5, passes through Point L. However, because of the rotation of the rotary table from angle $-Q°$ through angle $+Q°$ the form cutter will engage the root section along the convex pad (E+R) extending to the left of FIG. 5 through the midpoint of FIG. 5 at Point C.

Figure 1:
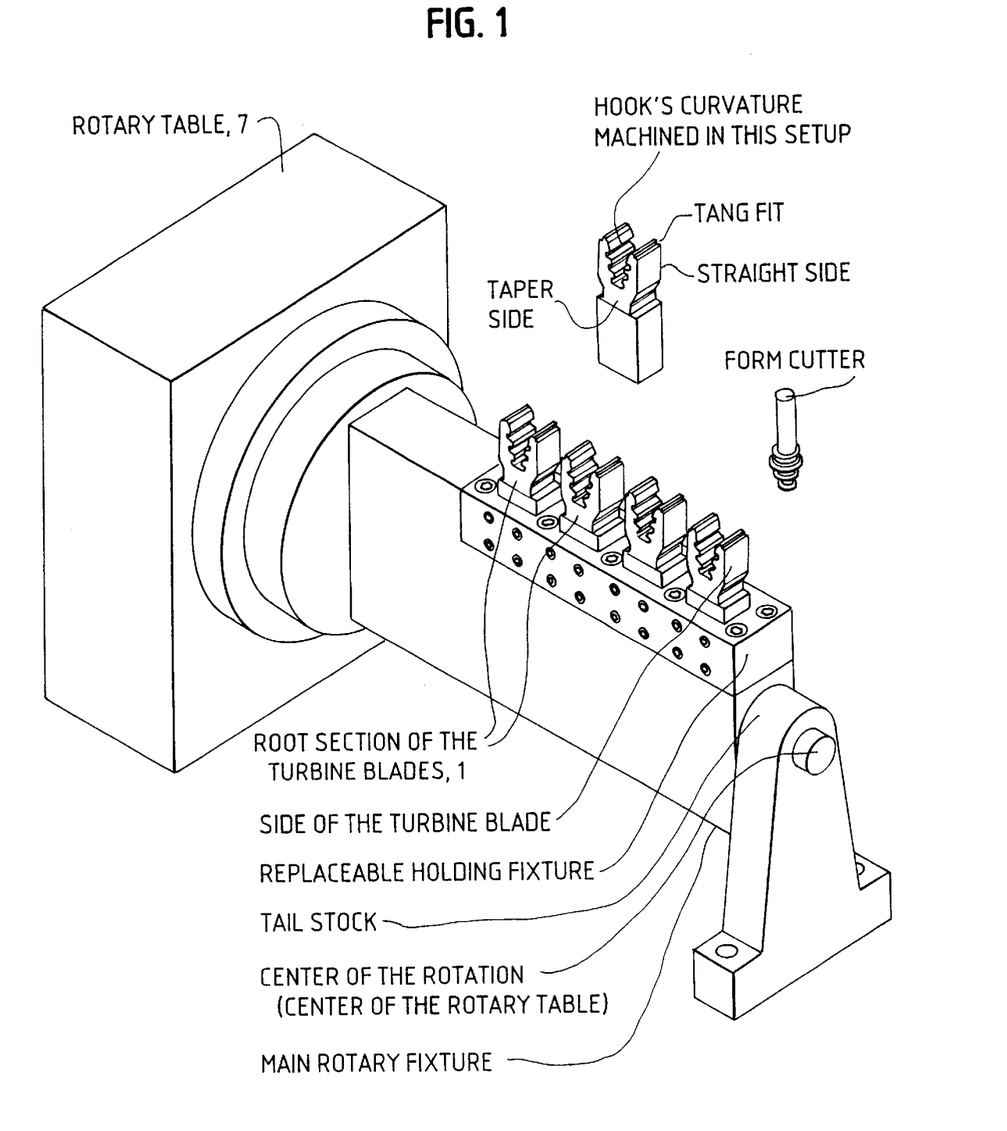
FIG. 1 is a perspective view of turbine buckets mounted upon a rotary fixture with the form cutter displayed.
Figure 2:
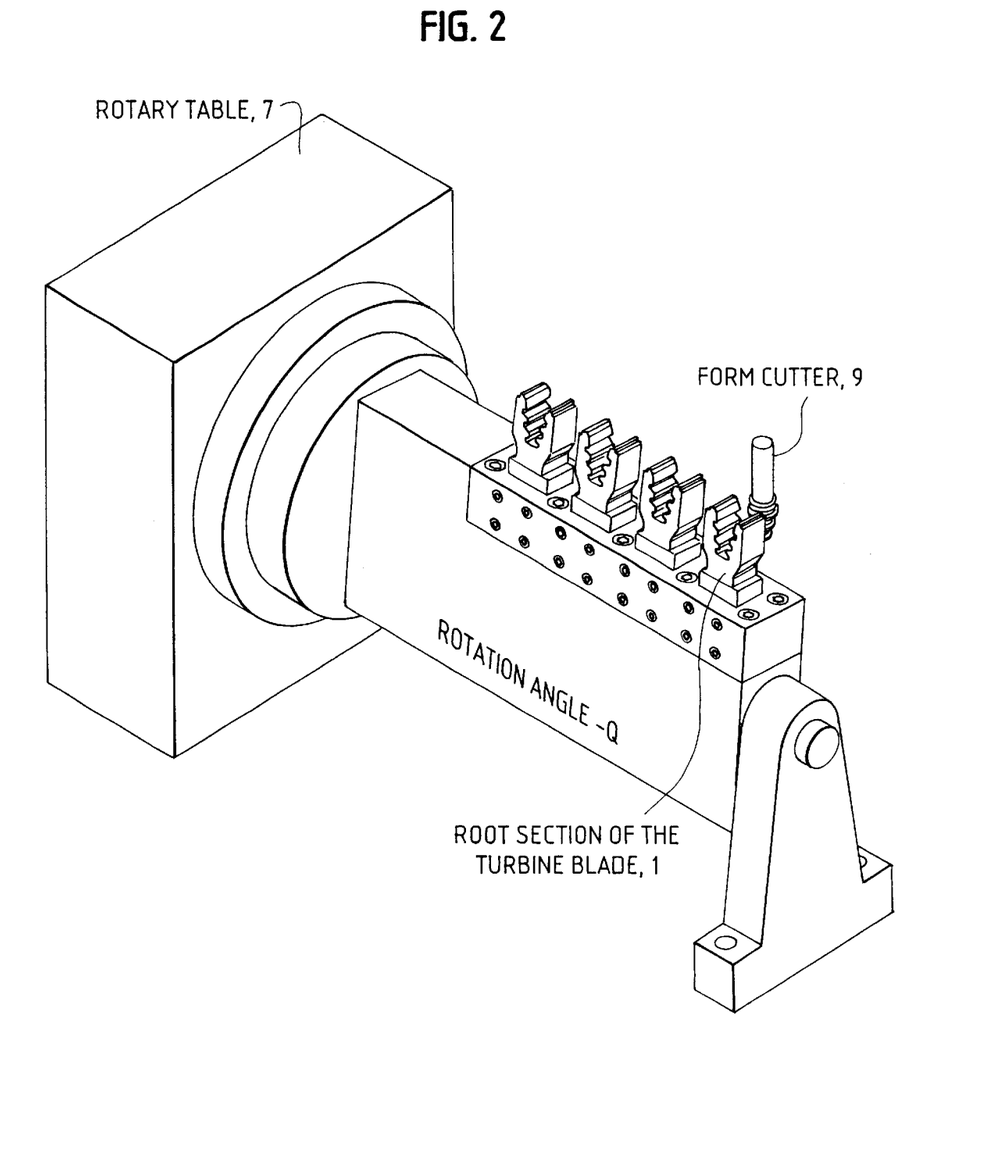
FIG. 2 is a perspective of turbine buckets mounted upon a rotary fixture with a form cutter approaching (angle $-Q)°$ cutting operation.
Figure 3:
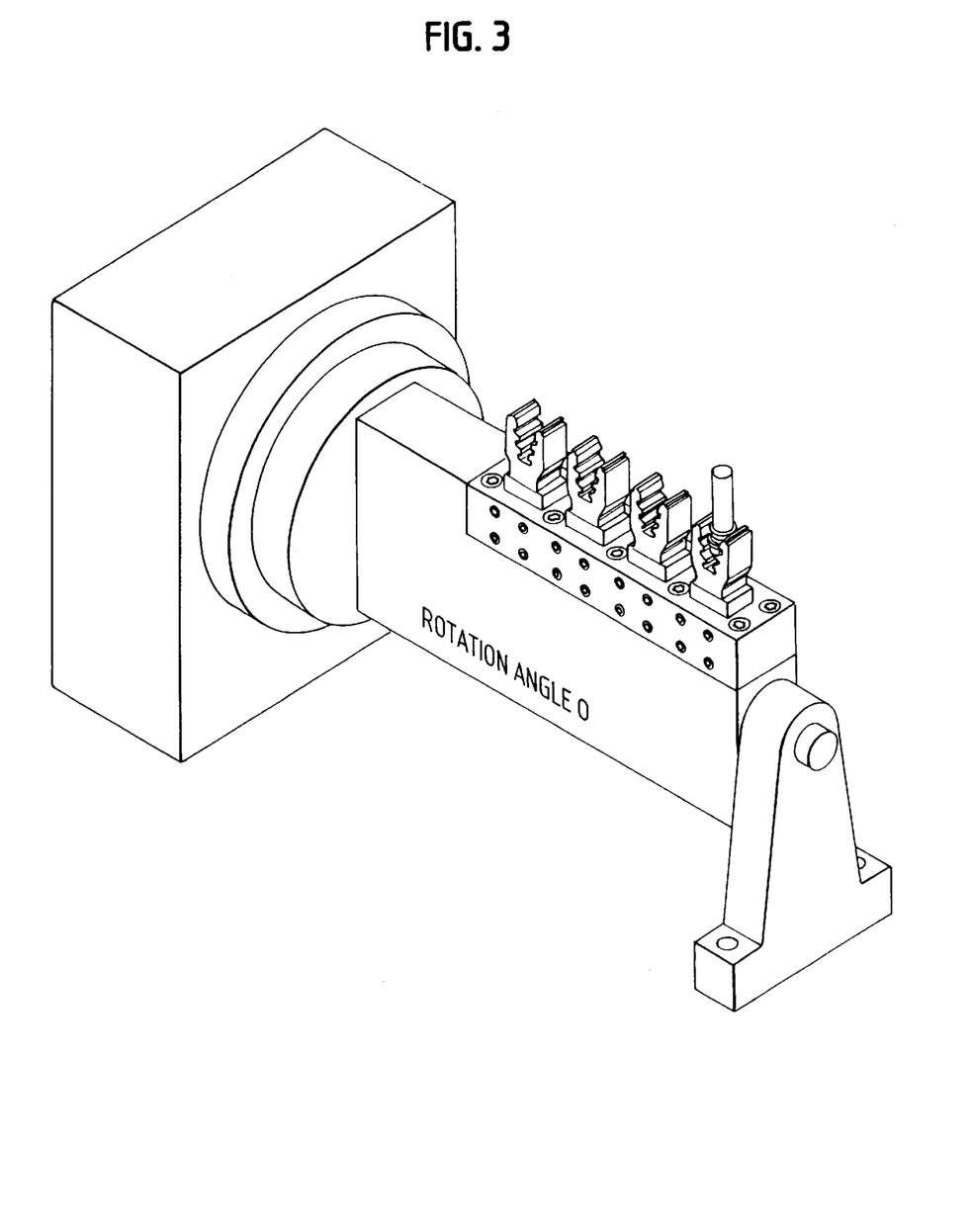
FIG. 3 is a perspective of a turbine bucket mounted upon a rotary fixture with a form cutter engaged in a cutting operation; (angle 0)°.
Figure 4:
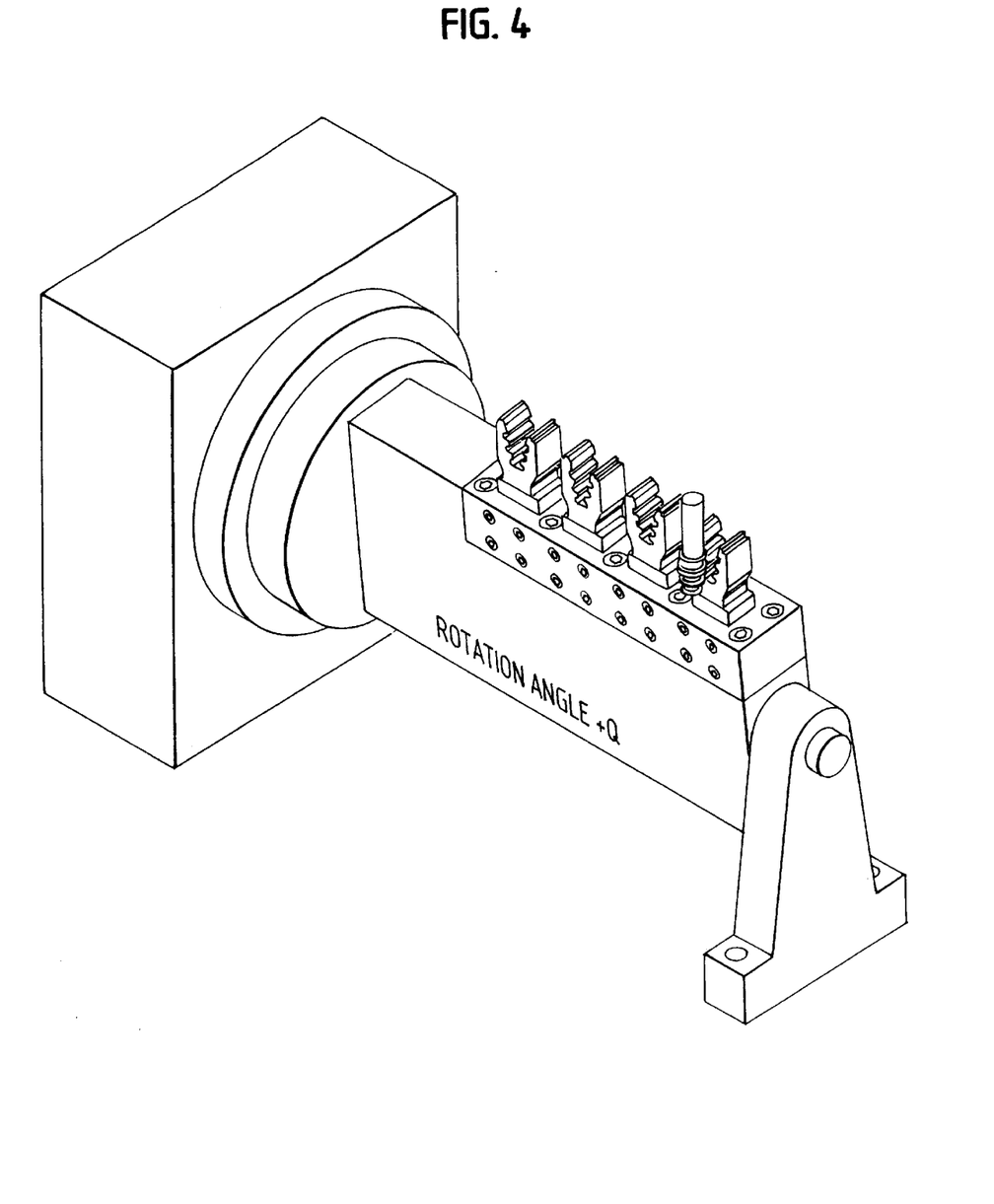
FIG. 4 is a perspective view of turbine buckets mounted upon a rotary fixture with the form cutter ending the cutting at angle $+Q°$.
Figure 5:
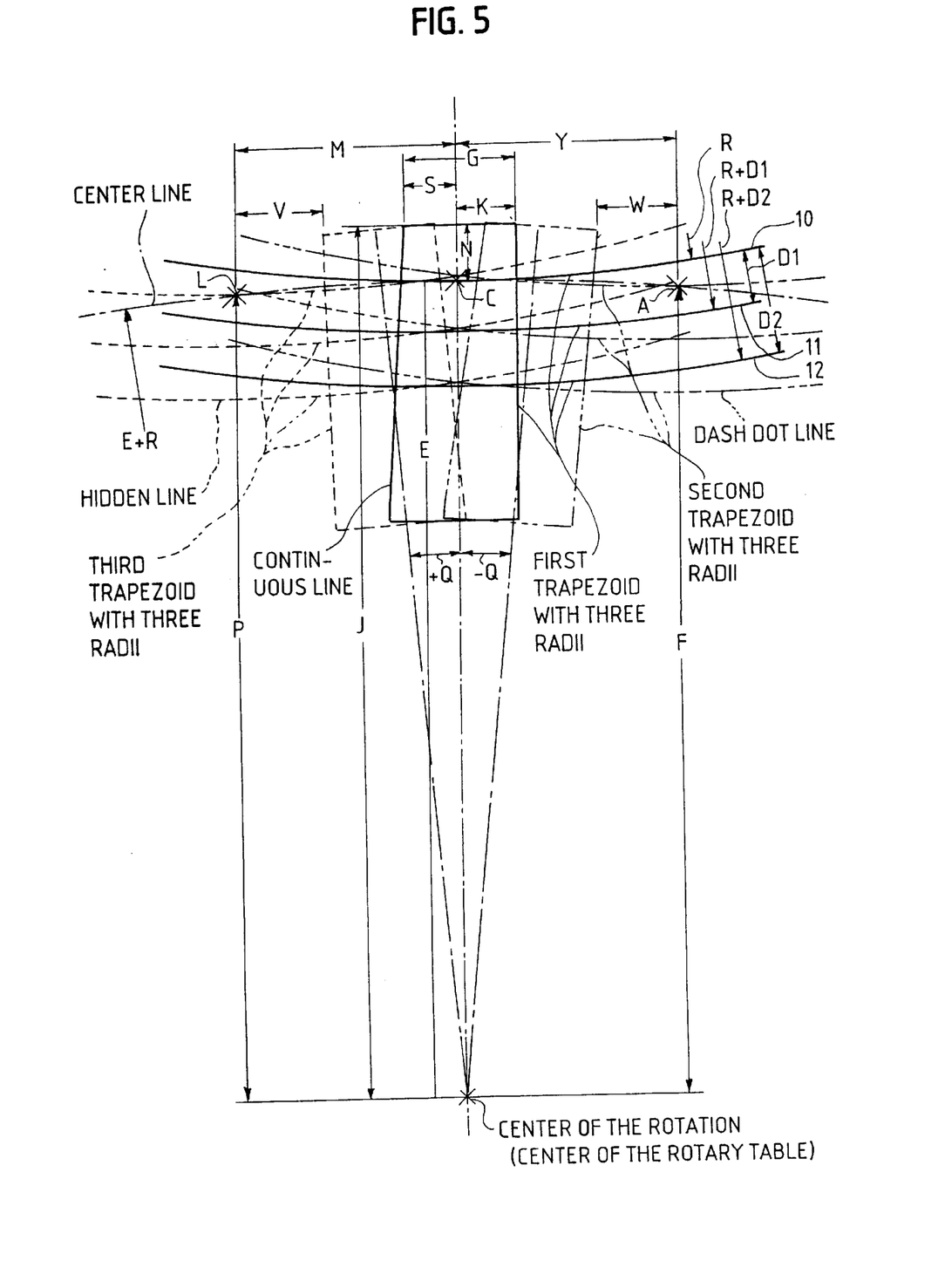
FIG. 5 is a more detailed diagram of the FIGS. 2, 3 and 4.

At Point C, the effect of the rotary motion of the rotary table in the opposite rotary angle of $+Q°$ occurs and the form cutter engages the root section along the line from Point C to Point L.

The position of the rotary form cutter is moved closer to the root section as is required to cut the three identical cut surfaces which form holding hooks. Reference to FIG. 5 explains the movement of the form cutter. As shown in FIG.

5, radiuses R, R+D1, and R+D2 are radiuses on the part and are depicted by FIGS. 1, 2, 3, and 4.

The details of FIG. 5 are as follows:

E+R=Value of convex radius obtained from construction of points L, C, and A; (shown as a center line)

L=Minimum distance P and distance M determined by angle +Q°;

C=Minimum distance E determined by angle 0°;

A=Minimum distance F and distance Y determined by angle −Q°;

V=Distance from point L (center of cuter) to corner of part after rotation;

M=Distance from point L to center of the rotation;

S=Distance from corner of taper side to center of gravity (dimension from FIG. 5 drawing);

K=Distance from center of gravity to straight side (dimension from FIG. 5);

G=Smaller pitch of blade (dimension from FIG. 5);

Y=Distance from center of the rotation to point A;

W=Distance from point A to corner of part after rotation;

D1=Distance from first hook to middle hook (dimension from FIG. 5);

D2=Distance from first hook to third hook (dimension from FIG. 5);

R=Radius on first hook (dimension from FIG. 5) holding hook;

E=Distance from center of rotary table to first hook holding hook;

−Q°=Angle of rotation to the right (needs to be chosen accordingly so W is greater than the radius of the cutter);

+Q°=Angle of rotation to the left (needs to be chosen accordingly so V is greater than the radius of the cutter;

P=Distance from center of rotary table to point L;

F=Distance from center of rotary table to point A;

J=Distance from the end of the blade after machining to the center of the rotary table (actual measured distance);

N=Distance from the end of the blade to the first hook measured in the centerline (dimension from FIG. 5).

The invented process uses a commercially available computer program for the process for machining the root sections of the turbine blades.

Commercially available program(s) can be used with a vertical or horizontal machining center with standard controls as an operating system. The program is used, based upon a trigonometric construction developed as indicated in FIGS. 2, 3, 4 and 5. As a particular example, program typing in manual mode by operator, points coordination's (A and L), angles (+Q° and −Q°) and radius (E+R) are obtained by CAD simulation program as follows:

G00G90X0.Y-1.7921Z2.A85.2

G00Z-1.7011M8;

G02X0.Y1.7921Z-1.7011R21.417A94.8F.003

In detail, the method of making the CAD simulation is as follows:

The general systematic explanation of making CAD simulation using variables is as follows:

Radiuses R, R+D1, and R+D2 are radiuses to machine on the part and are depicted by FIG. 5 A first trapezoid (continuous line) with three extended radiuses (R, R+D 1, R+D2) is drawn in angle 0°; D1 is the distance from first hook (10) to middle hook (11). D2 is the distance from the first hook to a third hook (12). This operation is applicable to turbine buckets with any number of hooks.

A second trapezoid (dash-dot line) with three radiuses is the rotated copy of the first FIGURE with radiuses to angle −°.

A third trapezoid (hidden line) with radiuses is the rotated copy of the first FIGURE with radiuses to angle +Q°.

For both rotations, the center of rotation is the center of the rotary table.

Point C is defined by minimum distance E

Point A is defined by minimum distance F

Point L is defined by minimum distance P

From the construction of points L, C, and A, a new radius valued E+R is determined In this point, the value of the new constructed radius is the sum of radius E+radius R Radius E is the distance from the center of rotation (center of rotary table) to the hook with radius R. The radius valued E+R is trigonometrically constructed;

The radius R is concave and radius E+R is convex. Dimension E can be chosen or determined after the setup is done but must be known to make this construction. Dimensions V & W are determined by the angle +Q° & −Q°. These dimensions have to be greater than the radius of the cutter so the cutter can clear the part when it approaches.

FIGS. 2, 3, 4 and 5, describe one machining cutting pass for machining the curvature on the hooks as determined by the controlling programming in use.

The form cutter approaches the turbine bucket at point A of angle −Q°. The position of the root section (1) and fixture is on angle −Q°. See FIG. 2. From this point, the form cutter travels (and cutter spins simultaneously) in radius E+R (convex line) to point L. (See FIGS. 3, 4, and 5) and rotary table simultaneously rotates left to angle +Q°. This operation can be approached at point L and finished at point A.

In a machine cutting by the invented method, the cutter centerline is constantly 90° to theoretical line which is tangent to arc in the cutting point. This action is obtained in two conventional methods for machining the curvature on the hooks by manual machines. One of them is the spindle on a pivot. The distance from the cutter to the pivot controls the radius machined on the hooks. In this method, the turbine bucket is a stationary part. In the second method, the turbine bucket(s) are installed on a rotary table and the radial position on the table controls the radius on the hooks. The CAD programming for machining and machining the curvature on the hook(s) is the main factor that makes the process possible to machine the root section of the turbine buckets completely in one setup.

This method described above using CAD programming completely machines the root section of rotating turbine buckets on a three axis computer numerical control vertical machining center with rotary table for small turbine buckets or three axes computer number control horizontal machining center with integrated rotary table for large turbine buckets.

In contrast, the prior art for machining the root section of a turbine blade can be as follows:

1. Cutting material
2. Machining on thickness (milling)
3. Deburring by hand
4. Grinding on thickness
5. Machining on width (milling)
6. Deburring by hand
7. Grinding on width 8. Roughing hook's shape and tang fits (milling)
9. Rough taper machining (milling)
10. Machining hook's curvature [(rough and finish) milling]
11. Final taper machining on sinus table (milling)
12. Hand grinding corners on dovetail shape
13. Sides machining (milling)
14. Steam balance machining if required These fourteen steps are separate and required to be moved for one machine to another for each step.

In the instant invention, all steps can be done on the vertical machining center with rotary table (for smaller buckets) or horizontal machining center with main rotary table (in this machine, the rotary table is larger and more rigid and is more suitable for larger buckets) with the following procedure:

1. Cutting material
2. Grinding on thickness (one side only) to clean up
3. Machining & one setup for complete root section (rough and finish);
   A. Taper side machining (rough and finish)
   B. Straight side finish
   C. Roughing hooks and machining tang fits to finish or with stock
   D. Machining curvature on hooks (rough and finish) using special programming
   E. Machining sides to finish
   F. Machining corners on dovetail shape (hand operation in previous process)
   G. Steam balance hole machining also can be done in this setup if required By comparing both methods, one can see fewer people are required, the product is made more precisely, and it is easier to control quality during production. In the invented process, it is possible to concentrate many operations into one setup because step D is possible to do in an integrated step.

In the prior art, this operation of Step D had to be separate. The way it was done, the part was mounted on the fixture in proper radial position. This radial position determined the radius machined on the hooks.

In the present method, the bucket is mounted in the fixture as in FIGS. 1, 2, 3 and 4 on the other side of rotation. In one radial position, any radius can be machined. For programming operation D, I decide to use a CAD simulation (FIG. 5) to obtain coordination of points A & L, rotation angles +Q & −Q and the value of the convex radius E+R.

To make this CAD simulation, the radius R is used, this is the radius on the first hook. All three radiuses R, R+D1, R+D2 are drawn from the same center (this information is from the drawing). The form cutter used for machining the radiuses has to have the same distance between the cutting edges as is between the hooks. This means that if the cutter is constantly 90° to theoretical tangent line in the cutting point on radius R, it is also 90° to theoretical tangent line in the cutting point to radius R+D1 and radius R+D2.

For this trigonometric construction, radius R, R+D1, or R+D2 can be used. Dimension E will change accordingly and needs to be measured from the center of rotation to the quadrant of the radius that is used for the construction.

The number of hooks does not limit this method as long as all radiuses are drawn from the same center.

The example of CAD was used as an example only. Rather, the path of the tool which will always be the same regardless of what method is used to find the needed coordination points, angles and radius the sum of E+R. See FIG. 5 and it is this that is the claimed invention.

Even if extremely short straight lines are used instead of the curved radius (E+R) as a tool path, the coordination of the end points will describe the points which still fall on the radius (E+R). Using extremely short lines instead of the curved radius (E+R) is just a different way to do the process described above. This method is an alternative method.

By using the operation described above, it becomes possible to machine the entire root section of turbine blades in one or more machine setups.

A. Taper side machining
B. Straight side machining
C. Roughing hooks and machining tang fits to finish or with stock
D. Machining curvature on hooks using the process described above
E. Machining sides to finish
F. Machining comers on dove tail shape
G. Steam balance hole machining can also be done in this setup if required The order of the operation A–G can be changed if necessary and steps can be added or removed if required.

The entire machining process for machining turbine blade root sections in one setup or multiple setups (to use other machines) is an aspect the instant invention of the instant invention.

What is claimed:

1. A method of determining machining instructions for milling machinery comprising at least a three-axis computer numerical control milling machine during machining of a work piece to machine precise concave and convex surfaces within a metal block, said method comprising, in combination, using a machine having a spinning form cutter and a rotary table, the surfaces of the work piece being defined by a plurality of programmed instructions for said computer numerical control milling machine obtained by trigonometric analysis of required curvatures of the surfaces and movements of said spinning form cutter and said rotary table, said movement of said spinning form cutter being in a convex path and said movement of said rotary table being to rotate simultaneously from a plus rotation angle to a minus rotation angle and, alternatively, from a minus rotation angle to a plus rotation angle, said programmed instructions determined by said trigonometric analysis of a diagram of required concave and convex surfaces of resulting root section of a turbine blade and movements of said spinning form cutter and rotary table, said root section having at least a first hook as a first holding hook.

2. The method of claim 1 wherein said trigonometric analysis of the required curvatures of the surfaces comprises analysis of a diagram of a graphical construction of the required curvatures of the surfaces and movements of said spinning cutter and said rotary table relative to the application of said spinning form cutter to the required curvatures of said root section of said turbine blade, said graphical construction consisting essentially of a trigonometric analysis, said root section comprising at least one holding hook.

3. The method of claim 1 wherein said trigonometric analysis of the required curvatures of the surfaces and movements of said spinning cutter and said rotary table determines the path of said spinning form cutter as a curved convex radius of E plus R wherein E is the distance from center of rotary table to first holding hook and R is the radius on the first holding hook.

4. The method of claim 1 wherein said trigonometric analysis of the required curvatures of the surfaces and movements of said spinning cutter and said rotary table determines the path of said spinning form cutter as a curved convex radius of E plus R wherein E+R of the convex radius is determined by points L, C, and A, L being the minimum distance P and distance M determined by angle +Q°, the angle of rotation to the left, C being the minimum distance E determined by the angle 0°; A being the minimum distance F and distance Y determined by angle −Q°, the angle of rotation to the right; E being the distance from center of rotary table to first holding hook, and R the radius on the first holding hook.

* * * * *

(12) EX PARTE REEXAMINATION CERTIFICATE (6642nd)

United States Patent
Oleksy (10) Number: US 6,449,529 C1
(45) Certificate Issued: Feb. 3, 2009

(54) PROCESS FOR CONTOUR MACHINING OF METAL BLOCKS

(76) Inventor: Henryk Oleksy, 1308 Drawbridge La., Lemont, IL (US) 60439

Reexamination Request:
No. 90/008,244, Oct. 2, 2006

Reexamination Certificate for:
Patent No.: 6,449,529
Issued: Sep. 10, 2002
Appl. No.: 09/477,858
Filed: Jan. 5, 2000

Related U.S. Application Data
(60) Provisional application No. 60/114,916, filed on Jan. 5, 1999.

(51) Int. Cl.
*G05B 19/4093* (2006.01)
*B23C 3/18* (2006.01)
*B23C 3/00* (2006.01)

(52) U.S. Cl. .................. 700/187; 29/889.1; 409/84
(58) Field of Classification Search .............. 700/187; 29/889.1; 409/84
See application file for complete search history.

(56) References Cited

U.S. PATENT DOCUMENTS

| | | |
|---|---|---|
| 4,031,369 A | 6/1977 | Heaman |
| 4,310,878 A | 1/1982 | Hyatt |
| 4,333,368 A | 6/1982 | Watt |
| 4,576,551 A | 3/1986 | Olivier et al. |
| 4,596,501 A | 6/1986 | Wu |
| 4,621,410 A | 11/1986 | Williamson |
| 4,921,405 A | 5/1990 | Wilson |
| 4,922,431 A | 5/1990 | Carter |
| 4,981,402 A | 1/1991 | Krenzer et al. |
| 5,106,266 A | 4/1992 | Borns et al. |
| 5,278,767 A | 1/1994 | Kishi et al. |

OTHER PUBLICATIONS

Chi–Cheng Ho; Feature–Based Process Planning And Automatic Numerical Control Part Programming; The University of Utah, Dec. 1997.
Jack Hugh; Engineer On Disk; Copyright 1993–2001; htt/://claymore.engineer.gvsu.edu.

*Primary Examiner*—Zoila E Cabrera (57) ABSTRACT

A method of determining machining instructions during machining of a workpiece using a machine having a cutter, the surfaces of the workpiece being defined by a plurality of programmed instructions obtained by trigonometric analysis of the required curvatures of the surfaces.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *